United States Patent

[11] 3,587,133

| [72] | Inventor | Emery I. Valyi<br>Riverdale, N.Y. |
|---|---|---|
| [21] | Appl. No. | 720,214 |
| [22] | Filed | Apr. 10, 1968 |
| [45] | Patented | June 28, 1971 |

[54] APPARATUS FOR PRESSURIZING HOLLOW ARTICLES DURING MOLDING
7 Claims, 3 Drawing Figs.

| [52] | U.S. Cl. | 18/5 |
|---|---|---|
| [51] | Int. Cl. | B29d 23/03 |
| [50] | Field of Search | 18/5 (BA), (BH), (BM), (BN), (BR), (BT), (BZ), (BS) |

[56] References Cited
UNITED STATES PATENTS

| 2,410,936 | 11/1946 | Gronemeyer et al. | 18/(5BMUX) |
|---|---|---|---|
| 2,930,079 | 3/1960 | Parfrey | 18/5(BA)X |
| 3,204,018 | 8/1965 | Hagen | 18/5(BT)X |
| 3,294,883 | 12/1966 | Polka | 18/5(BH)X |
| 3,325,862 | 6/1967 | Mehnert | 18/5(BP) |
| 3,340,569 | 9/1967 | Hagen | 18/(5BAUX) |

FOREIGN PATENTS

| 1,090,836 | 11/1967 | Great Britain | 18/5(BR) |
|---|---|---|---|

*Primary Examiner*—J. Spencer Overholser
*Assistant Examiner*—Michael O. Sutton
*Attorney*—Nathaniel L. Leek ABSTRACT: Molding apparatus including a blow mold containing a hollow blown article having an open neck portion and a transfer device to be indexed successively into registration with the blow mold. The transfer device is brought into engagement with the open neck of the article. Fluid pressure is supplied through the transfer device for gripping the neck of the article and to apply fluid pressure to the interior of the article. The blow mold is opened to release the article and the device is advanced to extract the article and carry it to a discharge station while maintaining internal fluid pressure during the cooling step. At the discharge station the fluid pressure is reduced to allow the transfer device to release the article.

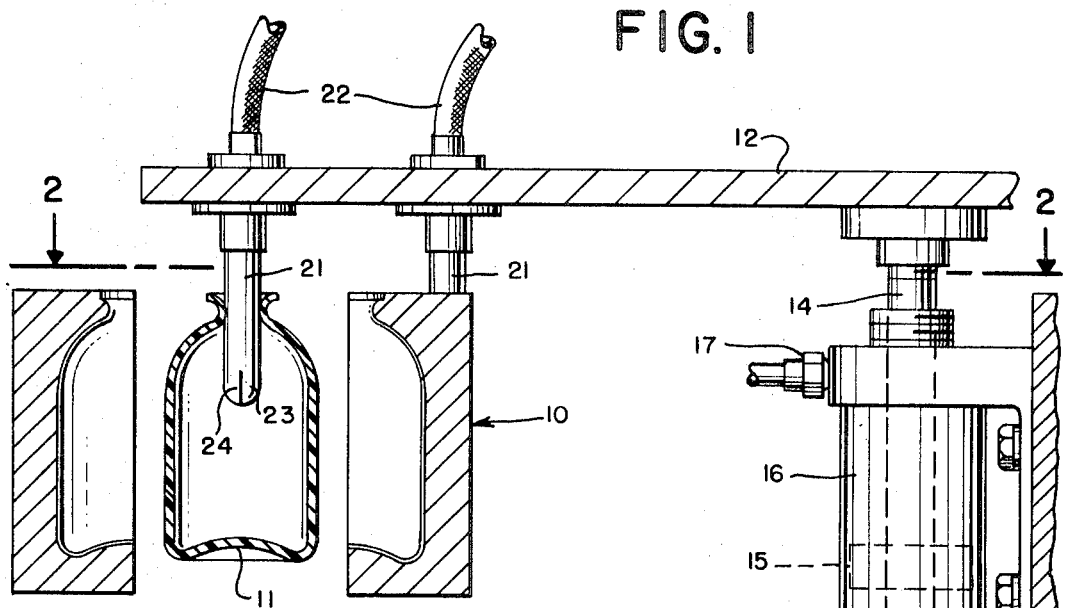
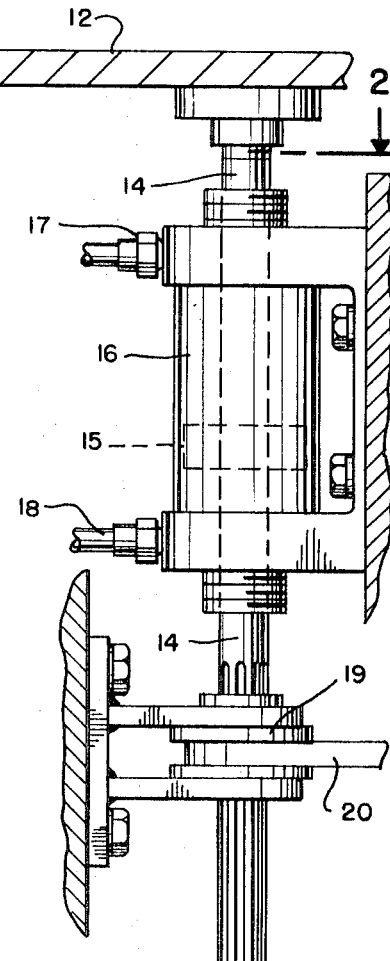
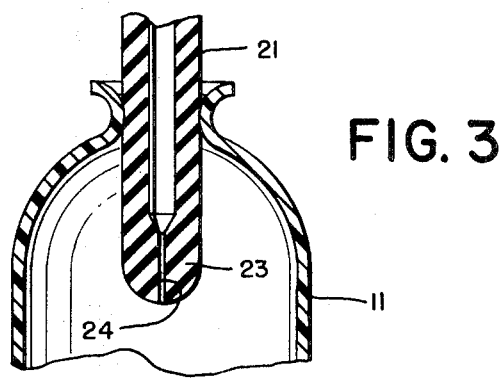
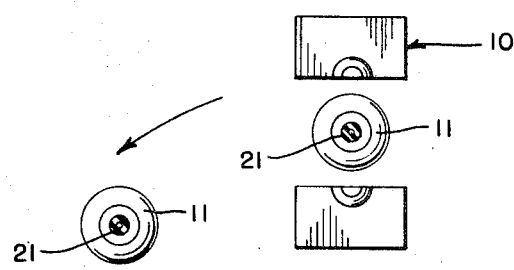
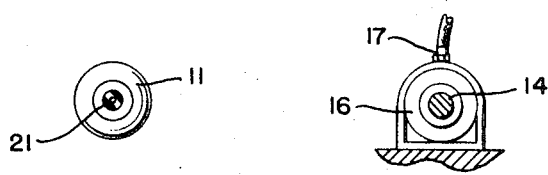
INVENTOR
EMERY I. VALYI
BY
ATTORNEY 3,587,133

APPARATUS FOR PRESSURIZING HOLLOW ARTICLES DURING MOLDING

This invention relates to apparatus for blow molding hollow articles of organic plastic material and more particularly to apparatus for maintaining the blown hollow article under internal pressure after removal from the blow mold and until the article has cooled to a temperature suitable for discharge.

Another object is to provide apparatus of the above type in which the blow mold is released for the next cycle of operation before the article has cooled to the final discharge temperature.

A more general object is to increase the output of blow molding apparatus of the above type.

Various other objects and advantages will be apparent as the nature of the invention is more fully disclosed.

Apparatus of the type referred to herein is disclosed more in detail in my U.S. Pat. No. 3,349,155 dated Oct. 24, 1967, which discloses a parison-molding station wherein a parison is molded on a blow core in a parison die and is transferred on the blow core to a blow mold station. After blowing the parison into the form of the hollow article in the blow mold, the blow core is extracted from the article and the blow mold with the blown article therein is transferred to a discharge station. The present invention provides means for gripping and pressurizing the blown article in the blow mold, removing the article from the blow mold and maintaining the article pressurized for the time necessary for cooling to the extend necessary for safe discharge. In thick-walled containers the cooling time tends to be very long and therefore the blow mold would be engaged during such a long cooling step rather than to be available for the production of another container. As here described, the blow mold is released for returning to the blow station for the next molding cycle long before the blown article last made in it is fully cooled. It is also noted that the blown article, if not maintained under pressure during most of the cooling cycle, would tend to deform and become unacceptable.

The nature of the invention will be better understood from the following description taken in connection with the accompanying drawing in which a specific embodiment has been set forth for purposes of illustration.

In the drawings:

FIG. 1 is a vertical section through molding apparatus embodying the invention;

FIG. 2 is a horizontal section taken on the line 2-2 of FIG. 1; and

FIG. 3 is an enlarged detail section illustrating the gripping of the article by the pressure finger.

Referring to the drawing more in detail a split blow mold 10 of the type shown in the above mentioned patent containing a blown article 11 from which the blow core has been withdrawn has been shifted from blow position into extraction position at which the article is to be removed. The article 11 because of its size or the thickness of its walls or other characteristics may require an appreciable time for cooling to a temperature such that it can be removed from the blow mold without danger of shrinking or of otherwise deforming. The present apparatus provides means for overcoming this difficulty and, at the same time, releasing the blow mold for use in its next cycle.

The apparatus is shown as comprising a turret plate 12 mounted for rotation and for axial movement on a shaft 14 carrying a piston 15 operating in a cylinder 16 having ducts 17 and 18 communicating therewith above and below the piston 15 for raising or lowering the shaft 14 and turret 12. A belt pulley 19 driven by a belt 20 is keyed to the shaft 14 for driving the same while permitting axial movement of the shaft.

The turret 12 carries a plurality of depending fingers 21 which are connected to a source of fluid pressure by lines 22. Each finger 21 is hollow and composed of flexible material such as rubber and is formed with an end portion 23 having a slit 24 therein which is forced open by fluid pressure applied from within the finger. The fingers also are adapted to expand in response to such fluid pressure for the purpose to be described.

The turret 12 is indexed by suitable means to bring a finger 21 over the open neck of the blown article 11 in the extraction station and the turret is then lowered by applying hydraulic pressure in the cylinder 16 above the piston 15 to a point such that the selected finger 21 enters the neck of the article. Fluid pressure is then applied from the source to expand the finger into gripping and sealing engagement with the neck of the article and to open the slit 24 for admitting the fluid pressure into the space within the article. This fluid pressure is selected, depending on the operating conditions of the blow mold, the material being molded and the wall thickness and shape of the article 11, of a value required to maintain the article under internal pressure suited to prevent shrinking or deformation of the article during the remainder of the cooling step.

With the article thus gripped and supported by the finger 21, the split mold 10 is opened to release the article and the turret 12 is advanced to remove the article from the mold which is then free to be returned to the blow station for receiving the next parison for blowing. The turret 12 is again raised by applying fluid pressure to the cylinder 16 below the piston 15 so that the next finger can be positioned over the next blow mold in the extraction position for repeating the above operation. Obviously, the turret 12 may be raised before the indexing step to withdraw the article from the blow mold depending upon the type of blow mold and the nature of the article.

The article remains suspended from the finger 21 through a series of indexing steps depending upon the time required for cooling to release condition. As the finger 21 reached this selected stage, the fluid pressure thereto is interrupted by suitable valve means whereupon the finger contracts to release the article and drop the same into a receiver.

While the apparatus has been described as suited for operation in conjunction with blow molding apparatus of the type shown in the patent above mentioned, it is obvious that it may be used in connection with other types of molding apparatus wherein it is desirable to release the mold for the next cycle before the molded article is completely ready for discharge.

I claim:

1. In an injection blow molding apparatus including a blow mold having a mold cavity carrying a blown hollow article having an open neck portion and free of any internal support member, a transfer device carrying at least one finger having a surface forming a pressure seal with said open neck portion and having a passage for the supply of fluid under pressure into said article, means indexing said transfer device to bring said finger into registration with the open end of said neck portion of said article within said blow mold in an extraction position, means advancing said finger into said neck portion, to cause said surface to grip and seal said neck portion, means supplying fluid under pressure trough said passage into said article, means retracting said finger to extract said article from said blow mold while maintaining said article carried by said finger and to advance said article to a discharge station, and means at said discharge station to disengage said finger from said article.

2. Molding apparatus as set forth in claim 1 in which said transfer device carries a plurality of said fingers and is mounted to be indexed to bring successive fingers to said extraction station.

3. Blow molding apparatus including a blow mold in which a hollow article having an open neck portion is formed and pressurized cooling means for said article comprising a turret carrying at least one hollow expandable finger having an end containing a closable passage which is openable in response to fluid pressure, means indexing said turret to bring said finger into registration with the open end of said neck portion of said article within said blow mold in an extraction position, means advancing said finger into said neck portion, means supplying fluid pressure to said finger to expand the same into gripping and sealing relationship with said neck portion and to open said passage to apply fluid pressure interiorly of said article, means advancing said finger to extract said article from said blow mold while maintaining said article suspended from said finger and under internal fluid pressure and to advance said article to a discharge station, and means at said discharge station to interrupt the fluid pressure to said finger for allowing the finger to contract and release said article.

4. Molding apparatus as set forth in claim 3 in which said turret is mounted for axial movement for inserting said fingers into said articles.

5. Molding apparatus as set forth in claim 1 in which said finger is composed of stretchable material and internal fluid pressure means is provided to expand said finger for gripping said open end portion.

6. Molding apparatus as set forth in claim 5 in which said finger is composed of material having the characteristics of rubber.

7. Apparatus as set forth in claim 5 in which said finger has an end opening through which fluid pressure is applied internally of said article.